United States Patent
Leighton et al.

(10) Patent No.: US 6,879,456 B2
(45) Date of Patent: Apr. 12, 2005

(54) DISK DRIVE WRITER WITH ACTIVE REFLECTION CANCELLATION

(75) Inventors: John D. Leighton, Anoka, MN (US); Scott M. O'Brien, Eagan, MN (US); Robert J. Wimmer, Hastings, MN (US); Nameeta Krenz, Carver, MN (US); Carl F. Elliott, Eden Prairie, MN (US); Michael J. O'Brien, St. Paul, MN (US); Cameron C. Rabe, Inver Grove Heights, MN (US)

(73) Assignee: Agere Systems Inc., Allentown, PA (US)

( * ) Notice: Subject to any disclaimer, the term of this patent is extended or adjusted under 35 U.S.C. 154(b) by 224 days.

(21) Appl. No.: 10/219,940

(22) Filed: Aug. 15, 2002

(65) Prior Publication Data

US 2004/0032682 A1 Feb. 19, 2004

(51) Int. Cl.[7] .................................................. G11B 5/02
(52) U.S. Cl. ............................ 360/68; 360/67; 360/53; 360/46
(58) Field of Search ............................ 360/68, 53, 67, 360/65, 61, 46, 281; 327/110, 310

(56) References Cited

U.S. PATENT DOCUMENTS

| | | | | |
|---|---|---|---|---|
| 6,121,800 A | * | 9/2000 | Leighton et al. ............ | 327/110 |
| 6,222,695 B1 | * | 4/2001 | Canario ........................ | 360/68 |
| 6,256,161 B1 | * | 7/2001 | Leighton et al. .............. | 360/67 |
| 6,512,646 B1 | * | 1/2003 | Leighton et al. .............. | 360/46 |
| 6,549,353 B1 | * | 4/2003 | Teterud ........................ | 360/46 |

* cited by examiner

*Primary Examiner*—Sinh Tran
*Assistant Examiner*—Natalia Figueroa
(74) *Attorney, Agent, or Firm*—Kinney & Lange, P.A.

(57) ABSTRACT

A write driver circuit selectively provides a write current through a write head in first and second opposite directions. The write driver circuit is connected to the write head through an interconnect. The write driver circuit provides an incident write current signal through the interconnect to the write head, and also provides a reflection cancellation signal through the interconnect to the write head. In an exemplary embodiment, the incident write current signal is provided by providing an incident voltage signal across the write head, and the reflection cancellation signal is provided by providing a reflection cancellation voltage signal across the write head. In an exemplary embodiment, the reflection cancellation signal is a delayed and filtered version of the incident write current signal that cancels a reflected signal that is reflected at the interface between the interconnect and the write head due to impedance mismatching.

15 Claims, 7 Drawing Sheets

DISK DRIVE WRITER WITH ACTIVE REFLECTION CANCELLATION

BACKGROUND OF THE INVENTION

The present invention relates to a driving circuit for the write head of a magnetic disk drive, and more particularly to a write driver utilizing active reflection cancellation to allow the circuit to provide an undistorted write signal with increased peak voltage delivered by the preamplifier compared to resistive impedance matched write circuits.

Rigid magnetic disk drives employ E-block assemblies supporting a plurality of actuator arms each having read and write heads at the distal end thereof and arranged to move with the E-block across the radius of the magnetic recording disk. The writer circuit, or write driver, is included in an integrated circuit chip mounted on the E-block at the proximal end of the actuator arms and is connected to the write heads at the distal end through interconnect cable.

A typical write circuit preamplifier generates a roughly square wave voltage pattern across a write head that results in a roughly square wave write current pattern through the write head. Each pulse is composed of a rise-time portion, an overshoot portion, and a steady-state portion. The overshoot portion is the portion of the pulse where the absolute value of the write current exceeds the absolute value of the steady-state current; for example, where the steady-state current is 40 mA, the overshoot current may reach a peak of about 70 mA. The rise-time is defined as the time that it takes the current to change from 10% to 90% of its steady-state value, as it swings from one direction to the other. Thus, for a writer programmed for 40 mA steady-state write current, the rise-time is defined as the time required for the current in the write head to change from −32 mA to +32 mA, and vice versa.

Historically, there have been many improvements to conventional write circuits to enhance their performance, primarily in the areas of enhancing the switching speed of the circuit to reduce the rise-time portion of the write current waveform, as well as working with the overshoot portion of the waveform to give a fast rise-time while minimizing undershoot and ringing. However, these improved write circuits have been unable to achieve impedance matching to the interconnect. Such impedance matching would require a small resistor in parallel with the write head which would shunt some of the write current away from the write head during operation of the circuit and thereby compromise the performance of the circuit. The lack of impedance matching results in pattern dependent distortion which limits the performance of the write circuit.

U.S. application Ser. No. 09/475,909 filed Dec. 30, 1999 for "Impedance-Matched Write Circuit" by J. Leighton, R. Barnett and T. Ngo, discloses an impedance-matched write circuit that operates on a principle that is somewhat different than that of conventional write circuits, thereby reducing or eliminating pattern dependent distortion. The impedance matching of this circuit improves the write driver's performance, but also results in a decrease in the voltage delivered by the write driver preamplifier caused by the voltage drop across the series impedance matching resistor.

It would be beneficial to provide a write driver that achieves the reduction and/or elimination of pattern dependent distortion that is provided by impedance matching while delivering the full voltage of the preamplifier to the write circuit. Such a write driver configuration is the subject of the present invention.

BRIEF SUMMARY OF THE INVENTION

The present invention is a write driver circuit and method for selectively providing a write current through a write head in first and second opposite directions. The write driver circuit is connected to the write head through an interconnect. The write driver circuit provides an incident write current signal through the interconnect to the write head, and also provides a reflection cancellation signal through the interconnect to the write head. In an exemplary embodiment, the incident write current signal is provided by providing an incident voltage signal across the write head, and the reflection cancellation signal is provided by providing a reflection cancellation voltage signal across the write head. In an exemplary embodiment, the reflection cancellation signal is a delayed and filtered version of the incident write current signal that cancels a reflected signal that is reflected at the interface between the interconnect and the write head due to impedance mismatching.

DETAILED DESCRIPTION

Figure 1:
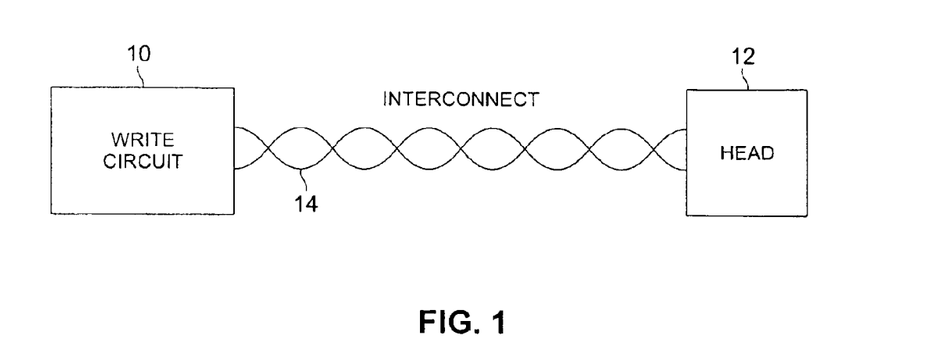
FIG. 1 is a diagram illustrating a write circuit connected to a write head via an interconnect in a manner common to storage devices such as disk drives.

FIG. 1 is a diagram illustrating write circuit 10 connected to write head 12 via interconnect 14, in a manner common to storage devices such as disk drives. While write head 12 is located to interact with the storage medium (such as a disk) directly, write circuit 10 is typically located remotely from write head 12, which is why interconnect 14 is required to connect write circuit 10 to write head 12.

Interconnect 14 has a characteristic impedance which is mismatched with the impedances of write circuit 10 and write head 12. In an exemplary configuration, interconnect 14 has 100 Ohms differential impedance (Zdiff) and 30 Ohms common-mode impedance (Zcm), and write head 12 has 7 nano-Henries of inductance (L) in parallel with 200 Ohms parallel resistance (Rp) with a series resistance of 10

Ohms (Rs) in series with the parallel L-Rp circuit. The impedance mismatch causes pattern dependent distortion resulting from reflection of signals at the write circuit-interconnect interface and at the interconnect-write head interface.

Figure 2:
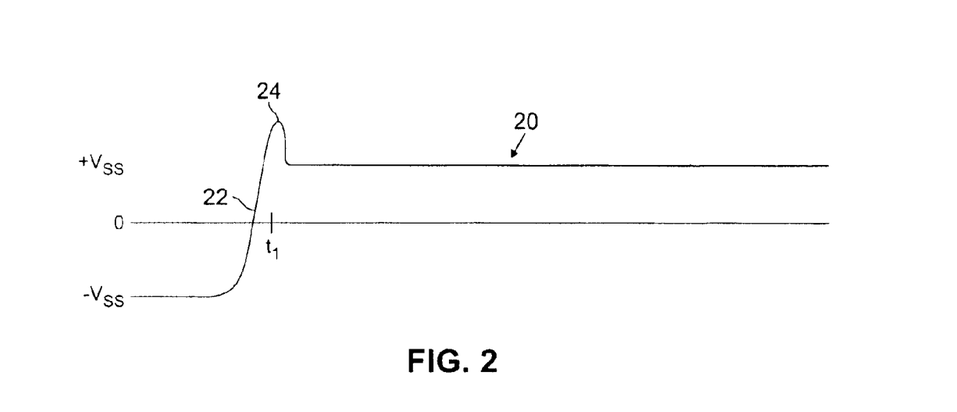
FIG. 2 is a diagram showing an exemplary write head voltage waveform provided by a write circuit across a write head.

FIG. 2 is a diagram showing an exemplary write head voltage waveform 20 provided by the write circuit across the write head. Write head voltage waveform 20 switches from an initial steady-state value (−Vss) to an opposite steady-state value (+Vss) in order to switch the direction of write current flowing through the write head. The waveform has a rise-time portion 22 when switching occurs, followed by an overshoot portion 24 and finally settling to the steady-state value.

Figure 3:
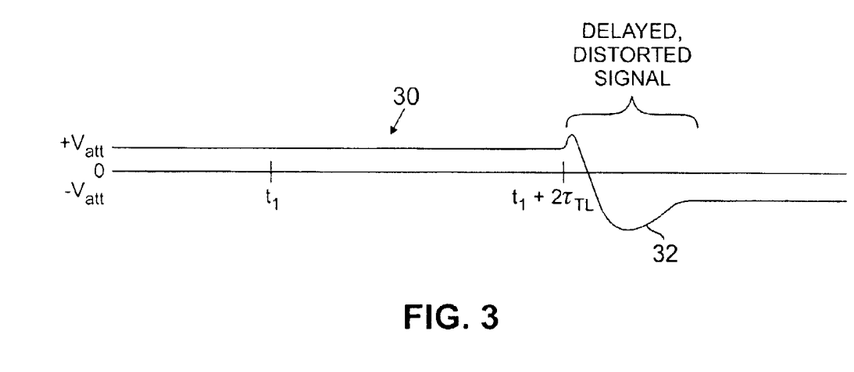
FIG. 3 is a diagram showing an exemplary reflected write head voltage waveform which is also present across a write head in a system that is not impedance matched.

FIG. 3 is a diagram showing an exemplary reflected write head voltage waveform 30 which is also present across the write head in a system that is not impedance matched. Referring briefly to FIG. 1, write circuit 10 generates a signal at time that travels along interconnect 14 to write head 12, arriving at time t1. The signal is reflected at the interface between interconnect 14 and write head 12 due to the impedance mismatch at that interface. The reflected signal is an attenuated and distorted version of the original signal, and it travels along interconnect 14 back to write circuit 10, where it is reflected again due to the impedance mismatch at the interface between interconnect 14 and write circuit 10. The reflected signal is further attenuated and distorted, and travels along interconnect 14 to write head 12, arriving at time (t1+2τ), where τ is the propagation time of interconnect 14. The "twice reflected" signal across the write head is shown as delayed, distorted signal 32 in FIG. 3. Thus, the total signal present across the write head is the sum of the generated write head voltage waveform 20 shown in FIG. 2 and the reflected write head voltage waveform 30 shown in FIG. 3.

The pattern dependent distortion of the reflected signal effectively limits the performance of the write driver circuit. One possibility for reducing reflections at the interconnect-write head interface is to move write circuit 10 onto the disk drive suspension so that write circuit 10 is located immediately adjacent to write head 12, eliminating the need for interconnect 14. There are many problems with this approach, including numerous mechanical issues and added cost, that make locating write circuit 10 on the disk drive suspension impractical.

Figure 4:
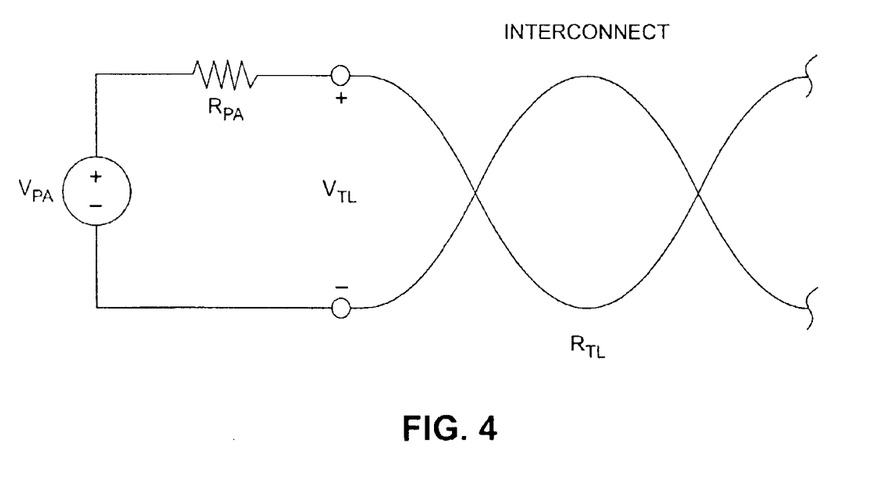
FIG. 4 is a diagram of an impedance matched write circuit.

As discussed previously, the reflections at the interfaces of interconnect 14 can be reduced or eliminated by implementing the impedance matched write circuit disclosed U.S. application Ser. No. 09/475,909. The concept of this circuit is shown in greatly simplified form in FIG. 4. While this circuit improves the write driver's performance, it also results in a decrease in the voltage ($V_{TL}$) delivered by the write driver preamplifier to the interconnect and on to the write head, caused by the voltage drop across the series impedance matching resistor ($R_{PA}$). As write current overshoot requirements continue to increase, there will be a continuing need for the write circuit to provide as much voltage as possible. The present invention is an alternative write circuit design for reducing or eliminating pattern dependent distortion while providing a high level of voltage to the interconnect and the write head.

Figure 5:
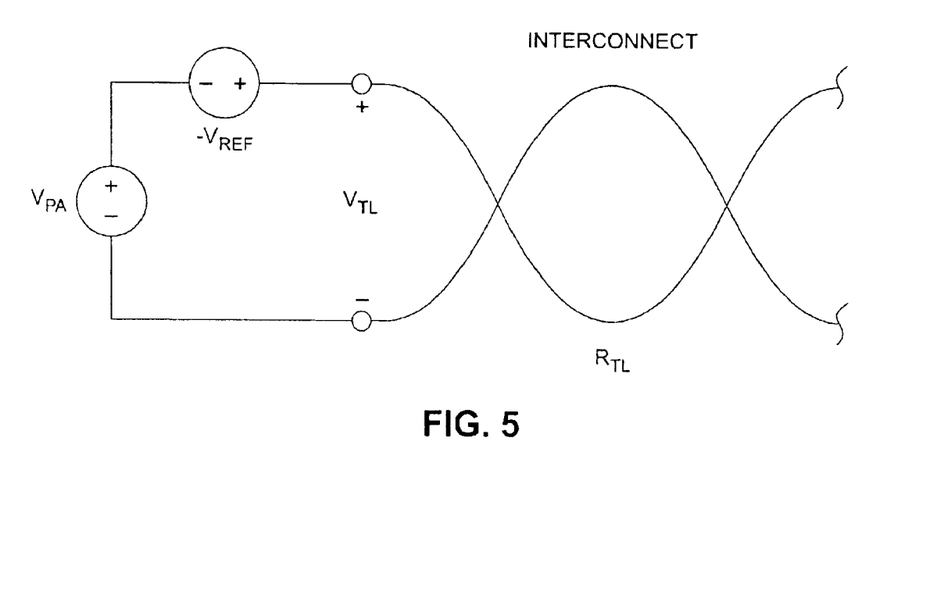
FIG. 5 is a diagram of a reflection cancellation circuit according to the present invention.

FIG. 5 is a diagram illustrating the concept of the present invention. A write circuit preamplifier generates a signal ($V_{PA}$) to drive the write head. This is the conventional write driver voltage signal, as shown in FIG. 2. The write circuit also generates a signal (−$V_{REF}$) to cancel the reflected signal ($V_{REF}$, shown in FIG. 3) caused by impedance mismatch that would otherwise result in pattern dependent distortion. The net signal delivered to the interconnect and on to the write head is therefore the same as the undistorted $V_{PA}$ signal shown in FIG. 2, since the actual reflected signal is canceled by the reflection cancellation signal. This configuration does not have a voltage drop across an impedance matching resistor, and thus can deliver the entire $V_{PA}$ peak voltage to the write head to provide the required write current overshoot capability.

In order to achieve the desired performance, the −$V_{REF}$ cancellation signal must accurately match the timing and shape of the actual reflected signal due to the impedance mismatch between the interconnect and the write head. The delay time of the cancellation signal is twice the propagation time of the interconnect. The amplitude is based on the generated waveform and the reflection coefficient of the interface between the interconnect and the write head. This reflection coefficient is defined as:

$$\Gamma = \frac{Z_H - R_{TL}}{Z_H + R_{TL}} \quad \text{(Eq. 1)}$$

where $Z_H$ is the impedance of the write head and $R_{TL}$ is the characteristic impedance of the interconnect.

Figure 6:
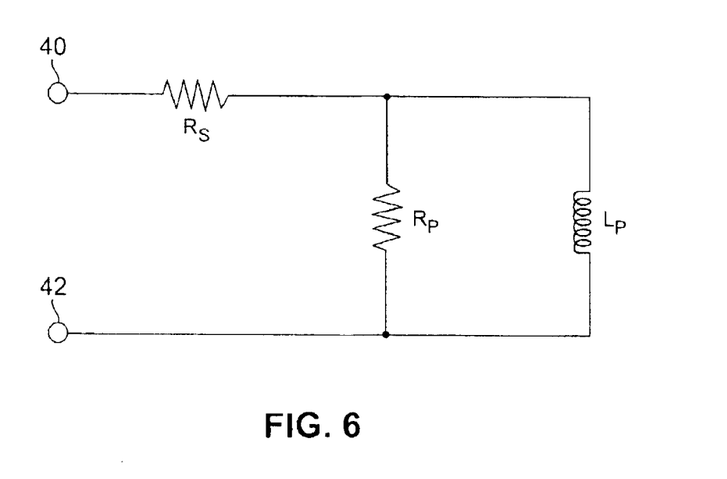
FIG. 6 is a diagram modeling the impedance characteristics of a write head.

The impedance of the write head can be modeled relatively simply in the manner shown in FIG. 6. The write head, defined between terminals 40 and 42, has a series resistance $R_S$, a parallel resistance $R_P$ and a parallel inductance $L_P$. Thus, the impedance of the write head model is defined as:

$$Z_H = R_S + \frac{j\omega R_P L_P}{R_P + j\omega L_P} \quad \text{(Eq. 2)}$$

Substituting Eq. 2 into Eq. 1 gives the reflection coefficient of the interface between the interconnect and the write head in terms of the write head and interconnect parameters:

$$\Gamma = \frac{R_P(R_S - R_{TL}) + j\omega L_P(R_P + R_S - R_{TL})}{R_P(R_S + R_{TL}) + j\omega L_P(R_P + R_S + R_{TL})} \quad \text{(Eq. 3)}$$

The reflection coefficient therefore consists of a pole and a zero:

$$2\pi f_{POLE} = \frac{R_P(R_S + R_{TL})}{L_P(R_P + R_S + R_{TL})} \quad \text{(Eq. 4)}$$

$$2\pi f_{ZERO} = \frac{R_P(R_S - R_{TL})}{L_P(R_P + R_S - R_{TL})} \quad \text{(Eq. 5)}$$

Figure 7:
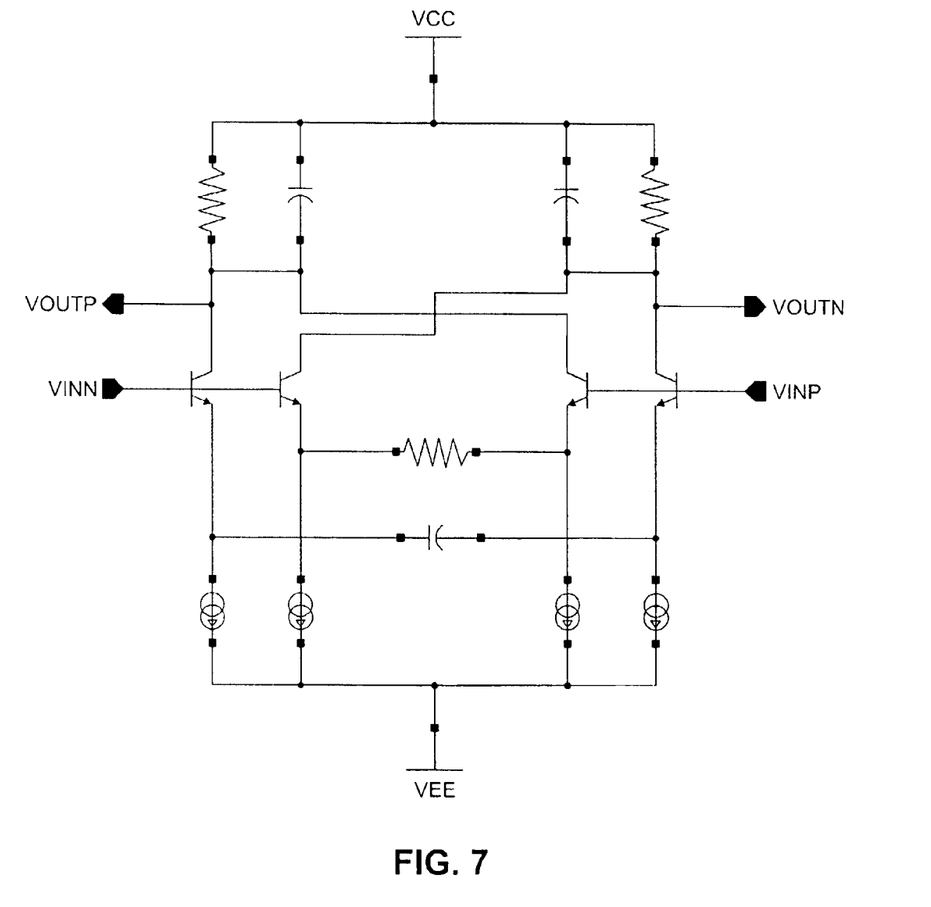
FIG. 7 is a diagram of an exemplary filter for emulating the reflection properties of the interface between an impedance mismatched interconnect and write head according to the present invention.

The pole and zero frequencies are readily quantified by employing the following typical system parameters:
$L_P$=7 nano-Henries (nH)
$R_S$=10 Ohms (Ω)
$R_P$=200 Ω
$R_{TL}$=70 Ω
$f_{POLE}$=−1.30 gigaHertz (GHz)
$f_{ZERO}$=1.95 GHz The frequencies of the poles and zero are convenient for realization by a relatively simple filter design known in the art. An example of a filter having these pole and zero frequencies is shown in FIG. 7.

Figure 8:
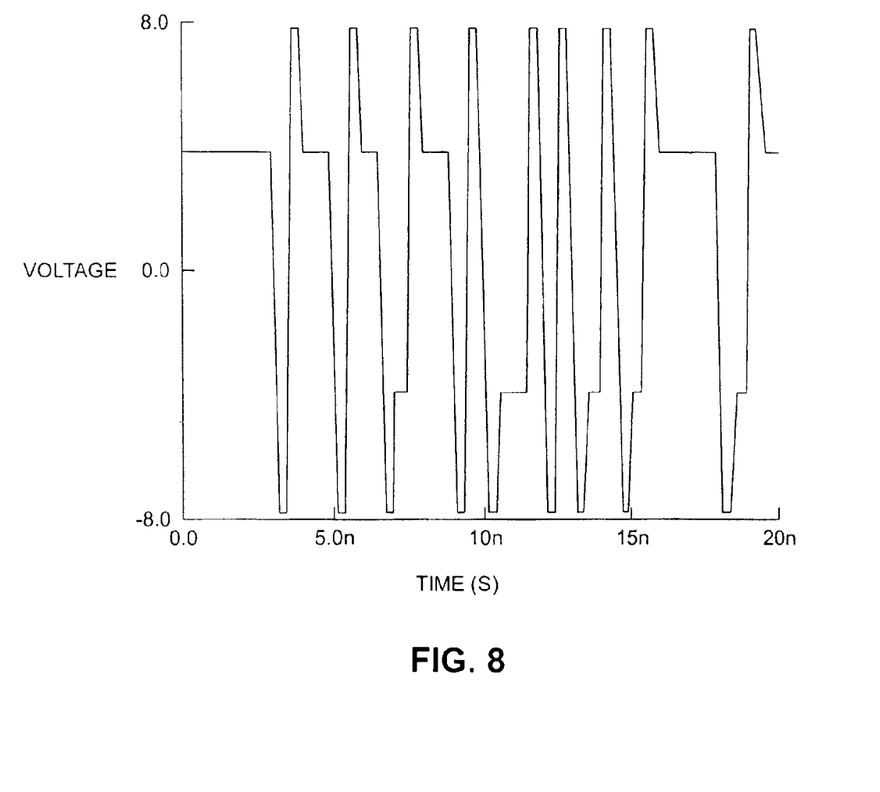
FIG. 8 is a diagram illustrating the signal generated by the preamplifier of a write circuit according to the present invention.

In order to effectively cancel a reflected signal, the cancellation signal must be both distorted properly (by the filter shown in FIG. 7 which emulates the reflection coefficient of the impedance mismatched interface between the interconnect and the write head) and delayed properly. Since analog delays are difficult to achieve in a silicon circuit context such as a disk drive circuit, it is preferable for the write voltage signal to be generated as a combination of square waves (digital signals), so that the delay function can be performed digitally, which is quite simple. The signal generated by the preamplifier ($V_{PA}$, FIG. 5) is therefore a summation of square waves, as shown in FIG. 8. The $V_{PA}$ waveform is constructed by summing two square waves, the second of which is delayed from the first by a programmed time constant. The $-V_{REF}$ signal (see FIG. 5) for canceling the reflected signal of the write circuit is constructed by delaying the $V_{PA}$ waveform by two interconnect time constants and by filtering it with a filter such as is shown in FIG. 7 to simulate the distortion caused by impedance mismatching.

Figure 9:
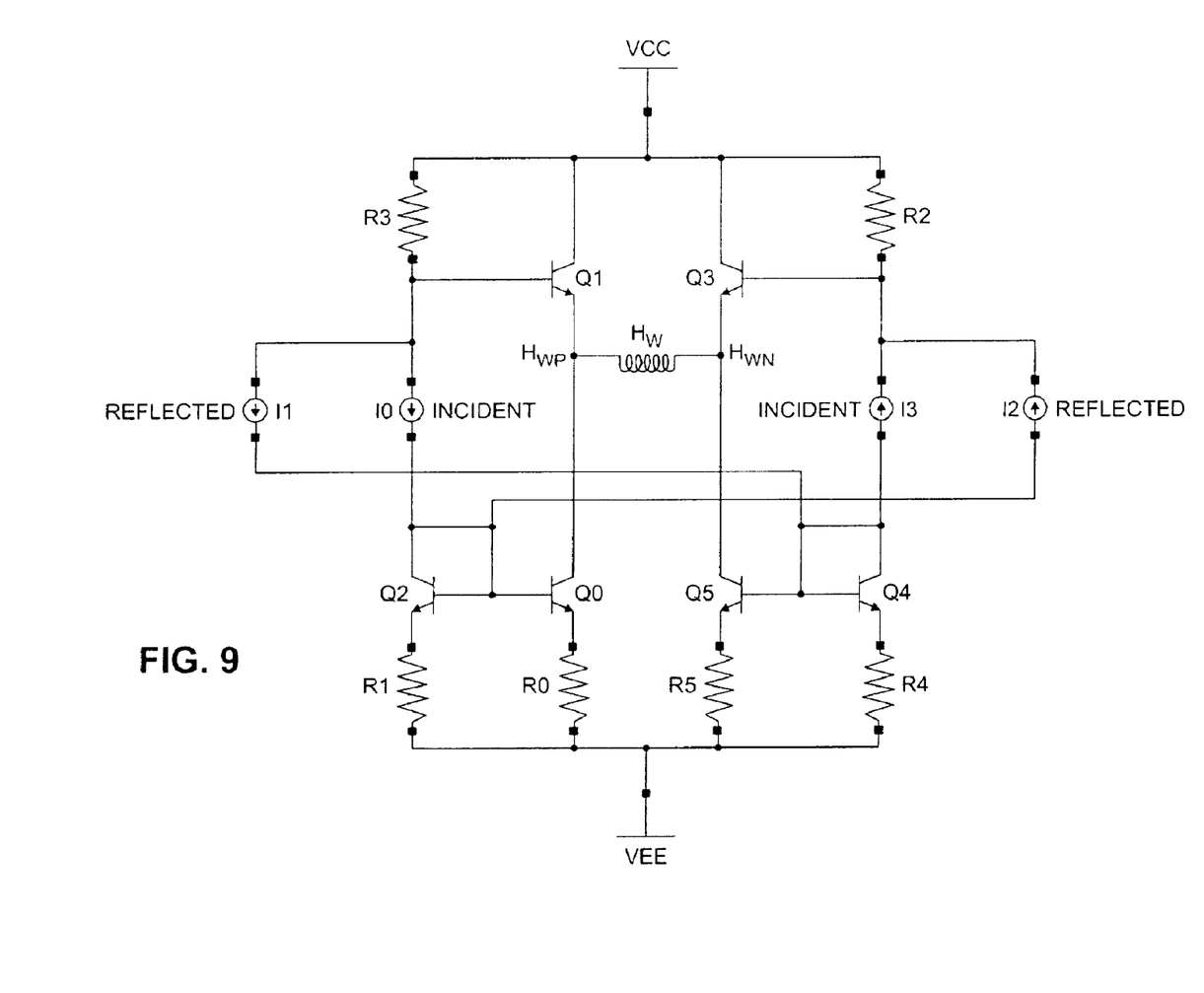
FIG. 9 is a diagram of a write circuit employing active reflection cancellation according to an exemplary embodiment of the present invention.

FIG. 9 is a diagram of a write circuit employing active reflection cancellation according to an exemplary embodiment of the present invention. The write circuit basically includes two parts: an upper section including a pair of emitter follower transistors (Q1 and Q3) and resistors R2 and R3, and a bottom section including a pair of current mirrors Q0–Q2 and Q5–Q4) and resistors R0, R1, R4, and R5. The circuit is configured as an H-bridge, as is generally well known in the art. In the embodiment shown, transistors Q1 and Q0 form one leg of the H, transistors Q3 and Q5 form the other leg of the H, and coil $H_W$ is connected across the center of the H between terminals $H_{WP}$ and $H_{WN}$. The difference between the present invention and conventional H-bridge write circuits lies in the signals used to drive the circuitry. The driving signals are shown as ideal current sources I0, I1, I2 and I3, representing the incident write current signal provided by the preamplifier (I0 and I3) and the reflection cancellation signal (I1 and I2), which is a delayed and filtered version of the incident write current signal as describe above.

In operation, the write circuit operates in an initial state when the incident write current signal is zero and the complement of the incident write current signal is a "high" value, meaning that no current flows through I0 and that current flows "down" (toward ground) through I3. In this initial state, transistor Q1 and the current mirror formed by transistors Q5 and Q4 are on, while transistor Q3 and the current mirror formed by transistors Q0 and Q2 are off.

When a transition is to be recorded by the write head, the write current through the head switches directions. Thus, the incident write current signal switches from zero to a "high" value and the complement of the incident write current signal switches from a "high" value to zero, meaning that current flows "down" (toward ground) through I0 and no current flows through I3. In this state, transistor Q3 and the current mirror formed by transistors Q0 and Q2 are on, while transistor Q1 and the current mirror formed by transistors Q5 and Q4 are off.

Following the switching of the write current by two interconnect time delays, the reflection cancellation signal cancels the actual reflected signal that is reflected back toward the write head. The reflection cancellation signal (I2) is mirrored by the current mirror formed by transistors Q0 and Q2, so that the I2 signal is subtracted from the incident write current signal I0. This effectively cancels the actual reflection of the write current signal that occurs due to the impedance mismatch at the interface between the interconnect and the write head.

When another transition is to be recorded by the write head, the write current through the head again switches directions. The incident write current signal switches from a "high" value to zero, meaning that no current flows through I0 and that current flows "down" (toward ground) through I3. In this state, transistor Q1 and the current mirror formed by transistors Q5 and Q4 are on, while transistor Q3 and the current mirror formed by transistors Q0 and Q2 are off.

Following the switching of the write current by two interconnect time delays, the complement of the reflection cancellation signal cancels the actual signal that is reflected back toward the write head. The complement of the reflection cancellation signal (I1) is mirrored by the current mirror formed by transistors Q5 and Q4, so that the I1 signal is subtracted from the incident write current signal I3. This effectively cancels the actual reflection of the write current signal that occurs due to the impedance mismatch at the interface between the interconnect and the write head.

The circuit shown in FIG. 9 illustrates the present invention's ability to provide a signal that cancels a reflected signal occurring due to interconnect-write head impedance mismatching. This allows a clean, undistorted signal to be delivered to the write head while avoiding a drop in voltage available that occurs due to impedance matching with a series resistor.

Figure 10:
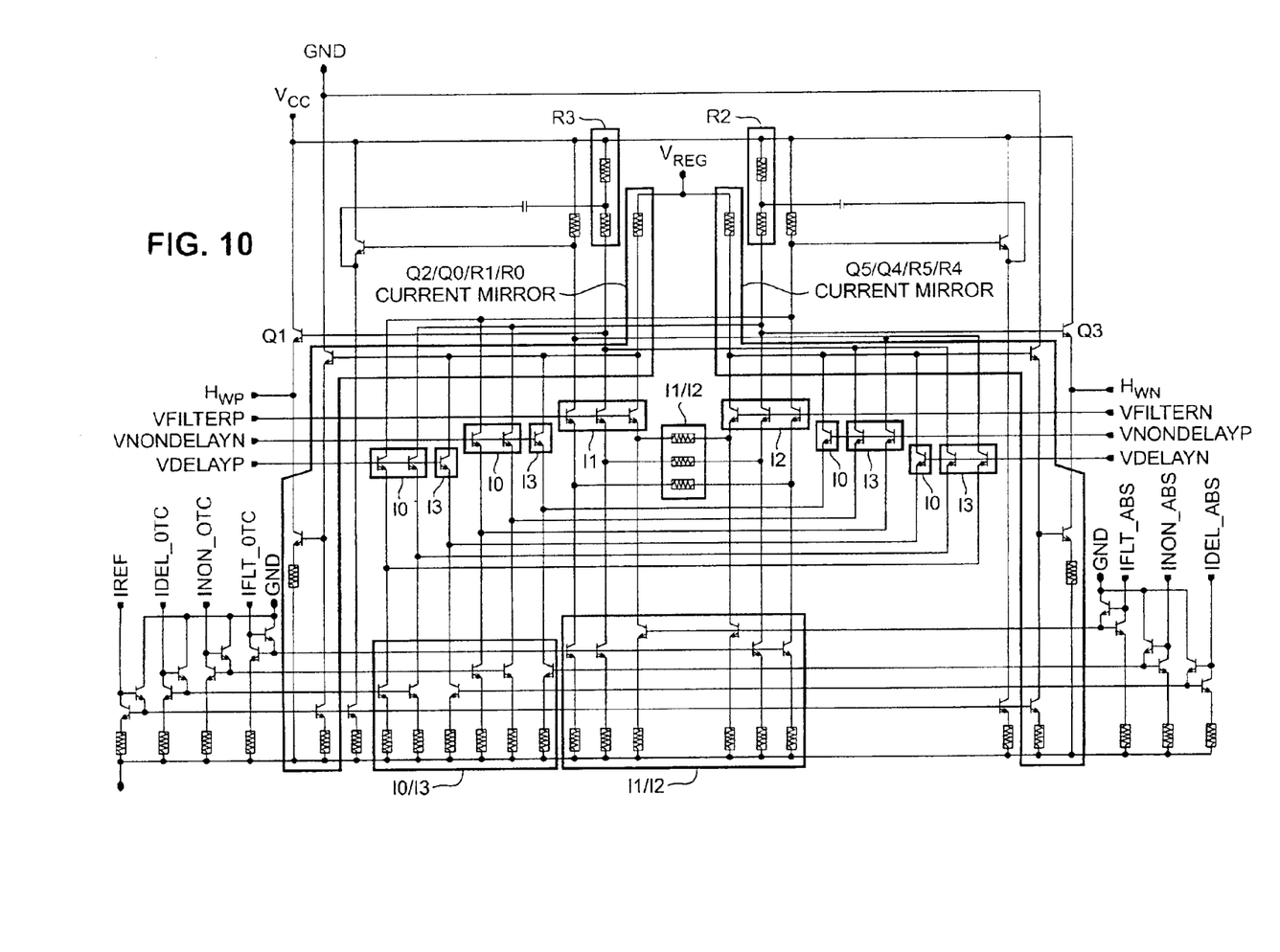
FIG. 10 is a diagram of an exemplary full circuit implementation of a write circuit employing active reflection cancellation in accordance with the present invention.

FIG. 10 is a diagram of an exemplary full circuit implementation of a write circuit employing active reflection cancellation in accordance with the present invention. It should be understood that the circuit shown in FIG. 10 is shown to illustrate the best mode of practicing the invention, and should not be considered to limit the scope of the invention in any way. The portions of the circuit which functionally represent the components shown in FIG. 9 are shown in labeled blocks in order to simplify the understanding of the circuit. One skilled in the art will readily discern the operating characteristics of the overall circuit, in conjunction with the specification and drawings of the instant application and of U.S. application Ser. No. 10/219,948 filed on even date herewith for "Disk Drive Writer With Capacitive Boost" by J. Leighton, C. Elliott, M. O'Brien, C. Rabe, N. Krenz, R. Wimmer and S. O'Brien, which is hereby incorporated by reference.

Specifically, FIG. 10 shows a connection to a filter at terminals VFILTERP and VFILTERN in order to emulate the reflection coefficient of the head to interconnect interface to generate reflection cancellation currents I1 and I2. The filter may be realized in an exemplary embodiment in the manner shown in FIG. 7. Terminals VNONDELAYN, VNONDELAYP, VDELAYP and VDELAYN provide the summed square wave signals for forming the write currents I0 and I3.

The present invention achieves the desirable effects of impedance matching (reduced or eliminated distortion of the write signal delivered to the write head) without the drop in signal level that occurs due to passive impedance matching, such as by a series impedance matching resistor. This is achieved by actively canceling the reflected signal that occurs to impedance mismatching between the interconnect and the write head. The reflection cancellation signal is generated by distorting the incident write signal with a filter that emulates the reflection coefficient of the interconnect-write head interface, and by delaying the signal by twice the interconnect propagation time. As a result, pattern dependent distortion in the write signal is reduced or eliminated, improving the performance of the write circuit.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logical gates and chips that could also be implemented by discrete devices, all within the scope and spirit of the present invention.

What is claimed is:

1. A method of selectively providing a write current through a write head in first and second opposite directions with a write driver circuit via an interconnect, the method comprising:

providing an incident write current signal through the interconnect to the write head; and providing a reflection cancellation signal through the interconnect to the write head.

2. The method of claim 1, wherein the reflection cancellation signal is a delayed and filtered version of the incident write current signal that cancels a reflected signal that is reflected at an interface between the interconnect and the write head.

3. The method of claim 2, wherein the interconnect has a characteristic propagation time, the interface between the interconnect and the write head has a reflection coefficient, and the reflection cancellation signal is delayed by a time equal to twice the characteristic propagation time of the interconnect and is filtered to match the reflection coefficient of the interface between the interconnect and the write head.

4. The method of claim 1, wherein providing an incident write current signal and providing a reflection cancellation signal comprises:

providing an incident voltage signal across the write head via the interconnect; and providing a reflection cancellation voltage signal across the write head via the interconnect.

5. A write driver circuit for selectively providing a write current through a write head in first and second opposite directions, the write driver circuit being connected to the write head by an interconnect and comprising:

a first voltage providing circuit that provides an incident voltage signal across the write head via the interconnect; and a second voltage providing circuit that provides a reflection cancellation voltage signal across the write head via the interconnect.

6. The write driver circuit of claim 5, wherein the second voltage providing circuit comprises a filter for attenuating and distorting the incident voltage signal and a delay circuit for delaying the incident voltage signal.

7. The write driver circuit of claim 6, wherein:

the interconnect has a characteristic propagation time;

an interface between the interconnect and the write head has a reflection coefficient;

the filter is configured to attenuate and distort the incident voltage signal to match the reflection coefficient of the interface between the interconnect and the write head; and the delay circuit is configured with a delay equal to twice the characteristic propagation time of the interconnect.

8. The write driver circuit of claim 5, wherein the write driver circuit includes switching circuitry for changing the polarity of the incident voltage signal and the reflection cancellation voltage signal across the write head, the switching circuitry having an H-bridge configuration comprising:

a pair of emitter follower transistors coupled between a first fixed potential and opposite terminals of the write head; and a pair of current mirrors coupled between the opposite terminals of the write head and a second fixed potential.

9. The write driver circuit of claim 5, wherein components of the write driver circuit are realized as an integrated circuit (IC).

10. A write signal selectively provided by a write driver circuit across a write head via an interconnect, the write signal comprising:

an incident voltage signal comprising a sum of a first square wave and a second square wave, wherein the second square wave is delayed from the first square wave; and a reflection cancellation voltage signal based on the incident voltage signal to simulate distortion caused by impedance mismatching between the interconnect and the write head.

11. The write signal of claim 10, wherein the reflection cancellation voltage signal is a delayed and filtered version of the incident voltage signal that cancels a reflected signal that is reflected at an interface between the interconnect and the write head.

12. The write signal of claim 11, wherein the reflection cancellation voltage signal is delayed by a time equal to twice a characteristic propagation time of the interconnect and is filtered to match a reflection coefficient of the interface between the interconnect and the write head.

13. A method of selectively providing a write signal across a write head with a write driver circuit via an interconnect, the method comprising:

summing a first square wave and a second square wave to produce an incident voltage signal through the interconnect to the write head, wherein the second square wave is delayed from the first square wave; and providing a reflection cancellation voltage signal through the interconnect to the write head that is based on the incident voltage signal.

14. The method of claim 13, wherein the reflection cancellation voltage signal is a delayed and filtered version of the incident voltage signal that cancels a reflected signal that is reflected at an interface between the interconnect and the write head.

15. The method of claim 14, wherein the reflection cancellation voltage signal is delayed by a time equal to twice a characteristic propagation time of the interconnect and is filtered to match a reflection coefficient of the interface between the interconnect and the write head.

* * * * *